United States Patent
Shaffer et al.

(10) Patent No.: US 6,373,940 B2
(45) Date of Patent: *Apr. 16, 2002

(54) METHOD AND APPARATUS FOR TRANSMITTING ADDRESS CHANGES

(75) Inventors: Shmuel Shaffer, Palo Alto; William Joseph Beyda, Cupertino, both of CA (US)

(73) Assignee: Siemens Information and Communication Networks, Inc.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,068

(22) Filed: May 4, 1998

(51) Int. Cl.[7] .................................................. H04M 1/00
(52) U.S. Cl. ............................. 379/355.02; 379/201.01
(58) Field of Search ........................ 379/201.01–201.12, 379/207.01–207.16, 219, 220.01, 213.01, 214.01, 216.01, 355.01–355.1, 356.01; 709/206

(56) References Cited

U.S. PATENT DOCUMENTS

| | | | | |
|---|---|---|---|---|
| 5,796,816 A | * | 8/1998 | Utsumi ........................ 379/381 |
| 5,920,610 A | * | 7/1999 | Arami et al. ................... 379/34 |
| 6,041,360 A | * | 3/2000 | Himmel et al. .............. 709/245 |

FOREIGN PATENT DOCUMENTS

JP       10 091859 A       4/1998

OTHER PUBLICATIONS

"Mail Address Change Notification"; IBM Technical Disclosure Bulletin, vol. 36, No. 1; Jan. 1, 1993, pp. 70–72.
"Mechanism to Automatic Updating Obsolete Telephone Numbers"; IBM Technical Disclosure Bulletin, vol. 37, No. 4A; Apr. 4, 1994, pp. 115–116.

* cited by examiner

Primary Examiner—Ahmad F. Matar
Assistant Examiner—Benny Q. Tieu

(57) ABSTRACT

A communication system for transmitting address changes. A communication system includes a source communication system and one or more destination communication systems, each of which is identified by a unique number or address. A memory in the source communication system maintains a record of each destination communication system that communicates with it. If the number or address of the source communication is changed, the source communication system generates a new number or address message which is transmitted to each of the destination communication systems. The destination communication systems receive the new number or address message and update a memory to reflect the new number or address of the source communication system. Those destination systems that are able to read the new number or address message and update a record of the number or address for the source communication system generate an acknowledge signal which is transmitted to the source communication system. The source communication system may transmit a human readable new number or address message to those destination communication systems that have not transmitted the acknowledge signal. The communications systems may comprise telephones, facsimile machines or computers having e-mail or IP addresses.

34 Claims, 3 Drawing Sheets

METHOD AND APPARATUS FOR TRANSMITTING ADDRESS CHANGES

FIELD OF THE INVENTION

The present invention relates to communication systems in general, and in particular to systems for recording address changes.

BACKGROUND OF THE INVENTION

With the current advancements in communication technology, most people now have several methods by which they can be contacted. These methods include telephones, fax machines, electronic mail accounts, pagers, etc. In general, each of these devices has a number or address that associates the device with a particular individual or location.

As will be appreciated, the task of updating a list of numbers or addresses used to reach a desired individual can be time-consuming and prone to error. For example, area codes are often modified or people move from one location to another thereby rendering their old telephone number out of date. Currently, most address changes are recorded by a trial and error process. A user calls or attempts to send a message to an old number or address. In the case of a telephone number that has been changed, an error message is played indicating that the number has been changed and the user must record the new number by hand. However, in the case of some technologies, like electronic mail, an error message may be produced that indicates that a message could not be delivered but does not indicate a new address that should be used.

Given the shortcomings in the prior art, there is a need for a method of simplifying the task of maintaining an address book with telephone numbers and/or addresses of desired recipients.

SUMMARY OF THE INVENTION

The present invention is a communication system that operates to automatically communicate a change in a number or address of a source communication system. A memory associated with the source communication system stores the numbers or addresses of those destination communication systems that communicate with the source communication system. A new number or address message is generated that indicates the new number or address for the source communication system and the message is transmitted to each of the destination communication systems. The destination communication systems read the new number or address message and update a memory with the new number or address of the source communication system. The destination communication systems preferably transmit an acknowledge signal to the source communication system if they were able to read the message and update the source communication system's number or address. For those systems unable to read the new number or address message, a voice or text message is generated by the source communication system and transmitted to the destination communication systems in order to inform a human operator of the change in the number or address of the source communication system. The voice or text message may also be transmitted to the destination communication systems that were able to read the new number or address message in order to inform a user that the memories of their communication system have been updated.

The present invention can be used to update the numbers or addresses of a variety of communication systems including telephone systems, facsimile machines or computer systems having an e-mail or Internet Protocol address.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a method and apparatus for automatically informing users of a change in a telephone number or address at which a recipient may be contacted. The telephone numbers or addresses are updated without a user having to first encounter an error message.

Figure 1:
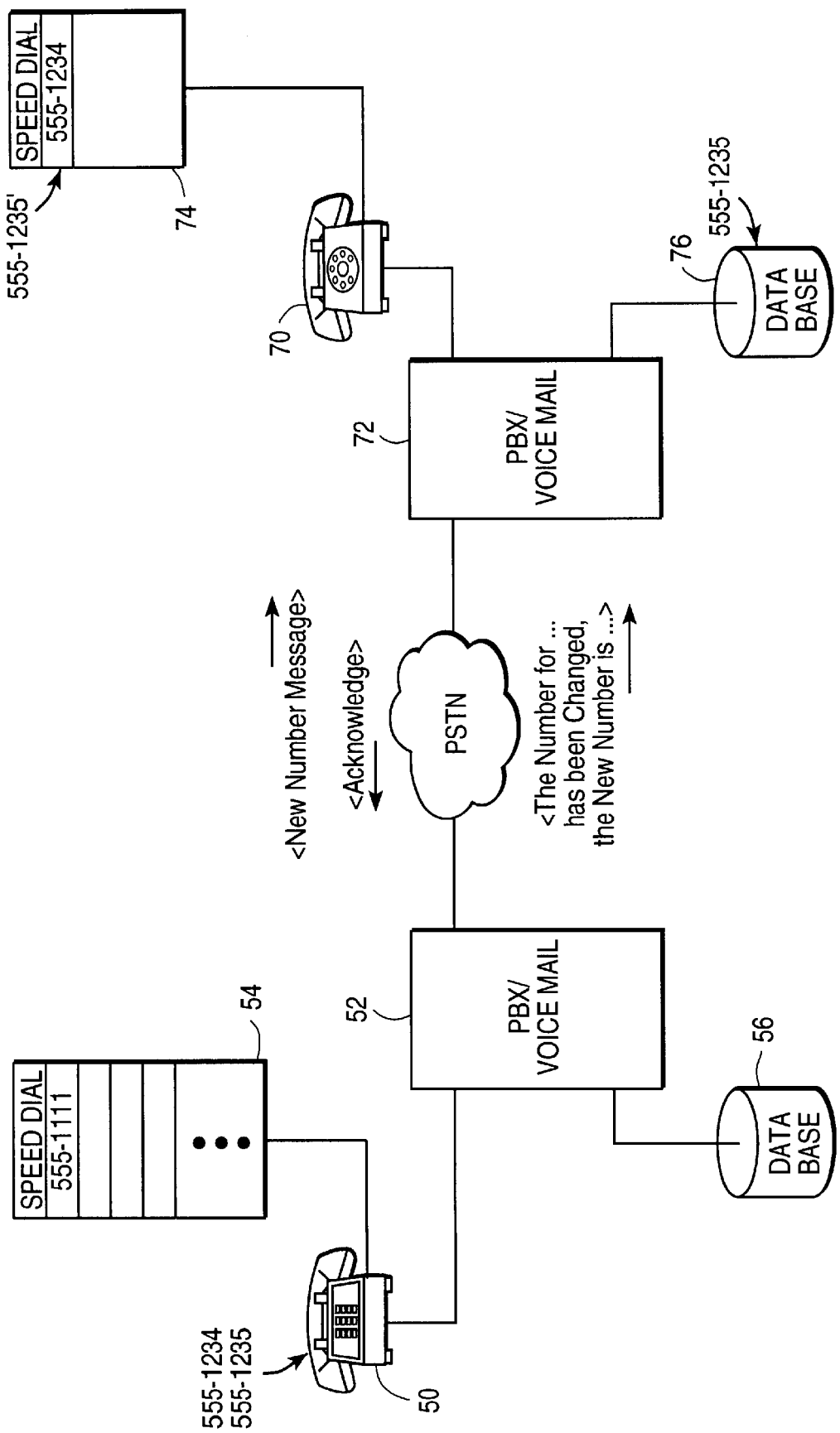
FIG. 1 is a block diagram of a system for updating telephone numbers according to the present invention.

FIG. 1 illustrates a telecommunication system in which the present invention is implemented. The system includes a source telephone 50 that is preferably connected through a private branch exchange (PBX) 52 to the public switched telephone network (PSTN). The source telephone 50 typically has a local "speed dial" memory 54 that stores one or more frequently dialed telephone numbers. In addition, the PBX 52 may have a database 56 that stores a record of all the numbers that have been dialed from the source telephone 50 or if the PBX is capable of decoding ANI messages, the database may keep a record of all the telephone numbers that have called the source telephone 50 within some predefined period of time, e.g. six months.

As frequently happens in today's communication environment, the telephone number of the source telephone 50 may be changed. For example, the source telephone may be assigned an original number such as 555-1234, and this number may be changed to a new number such as 555-1235. A user who is trying to contact the person at the telephone 50 using its previous number would typically encounter an error message indicating, "The number you have dialed has been changed. The new number is 555-1235. Please hang up and try your call again." This is not only frustrating for callers wishing to contact the person associated with the telephone 50 but is also prone to error if the caller does not copy down the error message correctly.

To facilitate the task of updating a record of telephone numbers, the present invention automatically updates the memories of those telephones that are frequently called by or frequently call the source telephone 50. For example, FIG. 1 illustrates a destination telephone 70 that is connected through a private branch exchange 72 to the public switched telephone network. The destination telephone has its own speed dial memory 74. In addition, the PBX 72 may have a database 76 that stores a record of all the numbers dialed from the telephone 70 or the numbers of the telephones that have recently called the telephone 70. To inform the destination telephone 70 and other frequently called telephones that its telephone number has been changed, the source telephone 50 recalls from the speed dial memory 54 or the database 56, the telephone number of those parties who frequently call the telephone 50 or are called from the telephone 50.

To inform the destination telephones of an updated telephone number, several approaches can be taken. First, if the source telephone 50 is associated with a voice mail application program, then a prerecorded audio message can be generated and sent to each telephone number in the list of telephone numbers frequently called or numbers that frequently call the telephone 50. These messages are either played to a recipient who answers the telephone or are recorded on the recipient's voice mail system or answering machine if present.

An alternative approach is to utilize an electronic "new number" signalling message which is broadcast to each of the destination telephones. The destination telephones or PBXs are equipped with a processing unit that is programmed to recognize the message as a new number message and to read from the message the old telephone number and the new telephone number. After reading the new number message, the destination telephone updates its speed dial memory 74 or record in the database 76 with the new telephone number. In addition to including the new telephone number, the new number signalling message may include some security or authorization code to prevent the unauthorized modification of another party's telephone memory.

An acknowledge signal is sent back from the destination telephone 70 or PBX 72 to the source telephone 50 or PBX 52 indicating that the new number message has been read and the record of the sending telephone's number has been updated. The source telephone 50 or PBX 52 can monitor the destination telephones from which an acknowledge signal is received. Those telephones not providing an acknowledge signal may be dialed and played an audio message that indicates the number of the source telephone has been changed. In addition, it may be advantageous to generate an audio message which is sent to the users of the destination telephones that were able to decode the new number message to indicate that their telephone memory has been automatically updated with a new number.

Although the example shown in FIG. 1 utilizes a PBX to store telephone number data and decode ANI messages, it will be appreciated that the present invention will also work with consumer telephones that store a list of frequently dialed numbers and contain a central processing unit that can decode digital signalling messages. Similarly, although the system shown in FIG. 1 illustrates the use of the present invention with telephones, it will be appreciated that the technique could be applied to other communication technologies such as facsimile machines.

Figure 2:
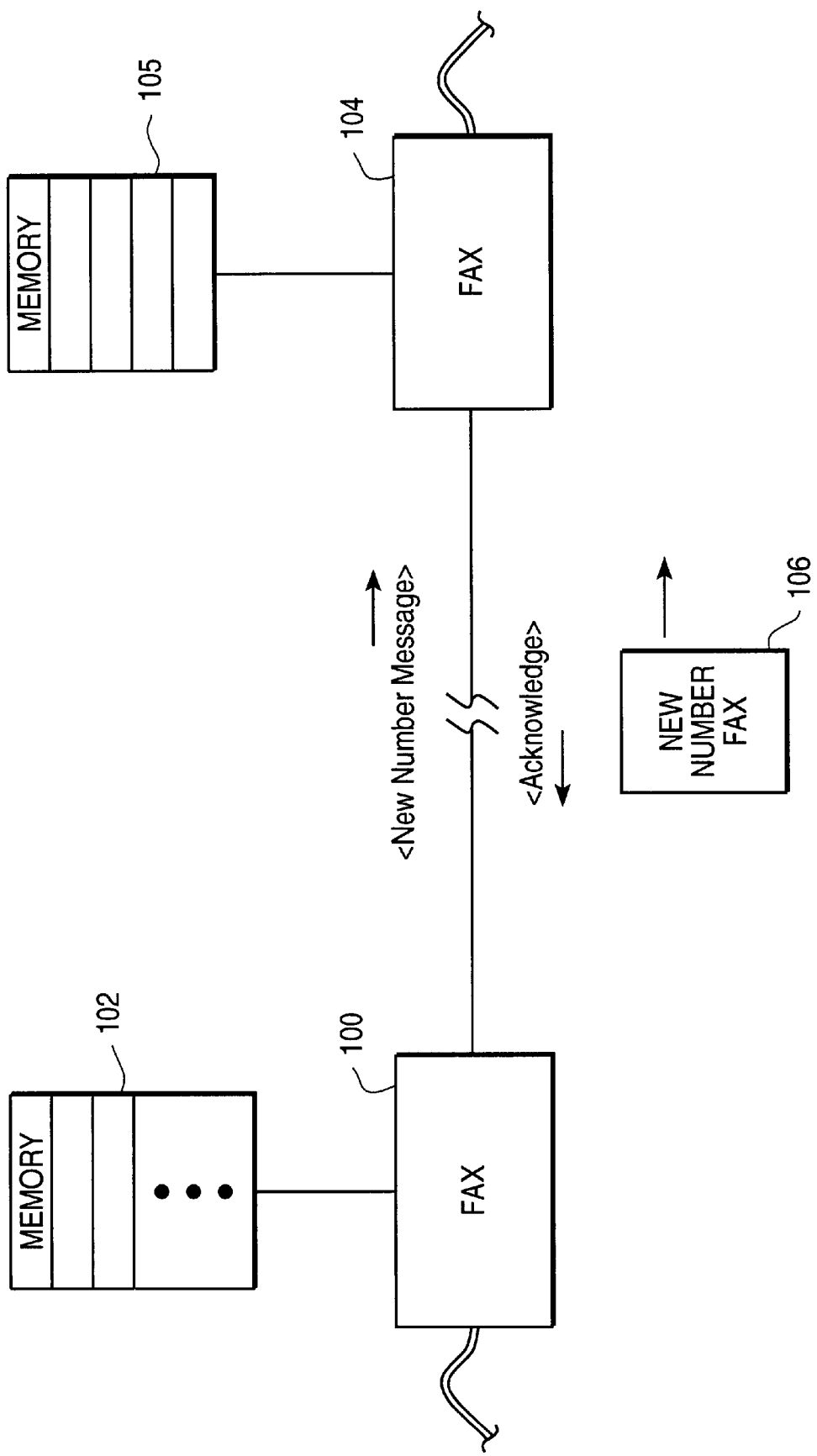
FIG. 2 is a block diagram of a system for updating the number of a facsimile machine according to the present invention.

FIG. 2 illustrates a facsimile machine 100 having a memory 102 that stores the telephone numbers of those facsimile machines that are frequently called. If the telephone number of the facsimile machine 100 is changed, a central processing unit within the facsimile machine 100 dials each number in its memory and sends each receiving facsimile machine a new number signalling message indicating that the telephone number of the sending facsimile machine has been changed. If a receiving machine 104 is able to decode the new number message and update its memory 105, an acknowledge signal is sent back to the sending facsimile machine 100. If no acknowledge signal is received, the facsimile machine 100 may generate a facsimile message which when received is printed as a hard copy indicating that the telephone number of the sending facsimile machine has been changed. An operator at the receiving facsimile machines would then read the hard copy message and update the facsimile machine's stored telephone numbers accordingly. Even if the receiving facsimile machine can decode the new number message, a facsimile message that is printed as a hard copy may be transmitted to inform a user that the memory of the facsimile machine has been updated.

Figure 3:
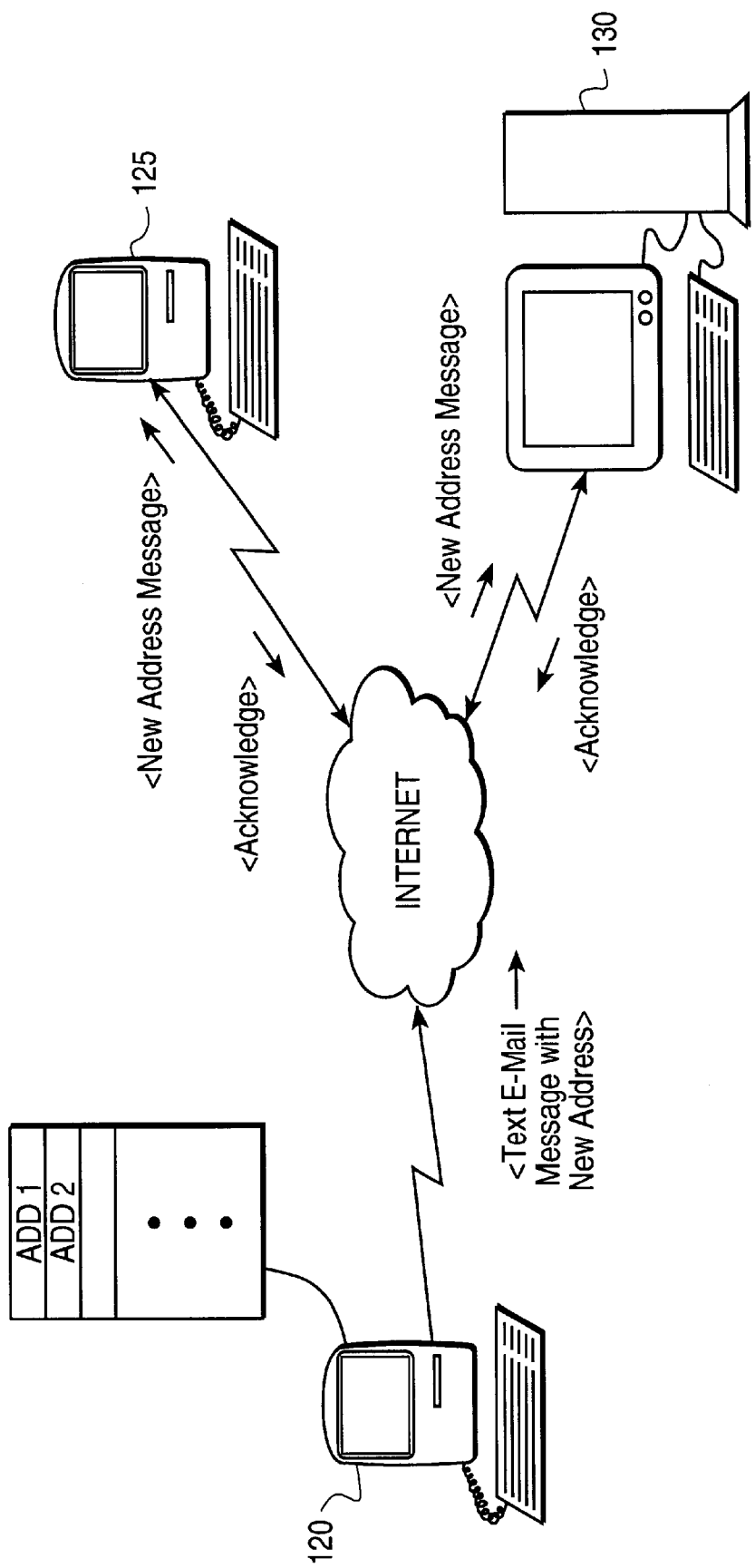
FIG. 3 is a block diagram of a system for updating an electronic mail address according to the present invention.

FIG. 3 illustrates how the present invention could be implemented in an electronic mail messaging system. In this example, a computer system 120 is identified by a unique electronic mail (e-mail) or Internet Protocol (IP) address. Messages are sent to other computers or computer systems via a local or wide area computer network, such as the Internet. If the e-mail address or Internet Protocol address of the computer 120 changes, then the computer system reads a list of addresses from a memory or address book that stores the addresses of those computer systems 125, 130 to which e-mail messages are commonly sent or from which e-mail messages are received. Each computer system 125, 130 having an address on the list is then sent a new address message indicating that the e-mail address or IP address for the source computer 120 has been changed. The new address message may be sent in electronic form that can only be read by the receiving computer systems and used to automatically update a memory or address book. Alternatively, the new address messages may be sent as text within a conventional e-mail message asking a user to manually update their address books. Once the memories or address books have been updated, acknowledge messages are sent back to the source computer system 120 that indicate that the addresses have been updated. In addition, it may be necessary to send those computers that could read the new address message a text based e-mail to inform the operators of the computers that the address for the source computer 120 has changed and that their computer's memory or address book has been automatically updated.

As can be seen from the above, the present invention is a system for automatically informing users of a change in a telephone number or other communication address. Using the present invention, users who communicate frequently no longer have to be subjected to error messages indicating that a number or address has been changed. Instead, the devices which they use to communicate are updated any time a number or address changes.

The embodiments of the invention in which an exclusive property or privilege is claimed are defined as follows:

1. A method of updating an identifier of a source telecommunication system, comprising:

recalling from a memory an identifier of at least one destination telecommunication system that has previously been in communication with the source communication system;

automatically determining and transmitting a message to the at least one destination telecommunication system, wherein the message indicates a new identifier for the source telecommunication system and indicates an old identifier that is replaced by the new identifier; and receiving the message at the at least one destination telecommunication system and updating a memory associated with each of the at least one destination telecommunication system with the new identifier for the source telecommunication system.

2. The method of claim 1, further comprising:

transmitting an acknowledge signal from the at least one destination telecommunication system back to the source telecommunication system if the at least one destination telecommunication system was able to receive the message indicating a new identifier for the source telecommunication system and update a memory that stores the identifier of the source telecommunication system.

3. The method of claim 2, further comprising:

generating a human understandable message that indicates a new identifier for the source telecommunication system.

4. The method of claim 3, wherein the message that indicates a new identifier is a signaling message that the at least one destination telecommunication system is programmed to recognize; and the human understandable message is transmitted to those destination telecommunication systems that did not transmit an acknowledge signal.

5. The method of claim 1, wherein the source telecommunication system is a telephone.

6. The method of claim 1, wherein the source telecommunication system is a facsimile machine.

7. A method of updating an identifier of a source telecommunication system, comprising:

recalling from a memory an identifier of at least one destination telecommunication system that has previously been in communication with the source telecommunication system;

automatically determining and transmitting a message to the at least one destination telecommunication system that indicates a new identifier for the source telecommunication system; and receiving the message at the at least one destination telecommunication system and updating a memory associated with each of the at least one destination telecommunication system with the new identifier for the source telecommunication system;

wherein the source telecommunication system is a telephone.

8. A method of updating an identifier of a source telecommunication system, comprising:

recalling from a memory an identifier of at least one destination telecommunication system that has previously been in communication with the source telecommunication system;

automatically determining and transmitting a message to the at least one destination telecommunication system that indicates a new identifier for the source telecommunication system; and receiving the message at the at least one destination telecommunication system and updating a memory associated with each of the at least one destination telecommunication system with the new identifier for the source telecommunication system;

wherein the source telecommunication system is a facsimile machine.

9. A telecommunication system including a source telecommunication device that is identified by a unique identifier and at least one destination telecommunication device, each such destination device being identified by a unique identifier, comprising:

a memory associated with the source telecommunication device that stores an identifier of at least one destination telecommunication device that has previously communicated with the source telecommunication device;

a processor coupled to the source telecommunication device that is programmed to recall the identifier of the at least one destination telecommunication device that has previously communicated with the source telecommunication device, the processor being further programmed to generate a message indicating a new identifier for the source telecommunication device and indicating an old identifier for the source telecommunication device and to transmit the message to each destination telecommunication device; and a processor coupled to each destination telecommunication device that receives the message and updates a memory that stores said new identifier for the source telecommunication device.

10. The communication system of claim 9, wherein the source telecommunication device and the at least one destination telecommunication device are telephones.

11. The telecommunication system of claim 9, wherein the source telecommunication device and the at least one destination telecommunication device are facsimile machines.

12. A method of updating an identifier of a source communication system, comprising:

recalling from a memory an identifier of at least one destination communication system that has previously been in communication with the source communication system, at least one of which destination systems is outside a local area network;

transmitting a message to the at least one destination communication system that indicates a new identifier that is for use in contacting a person associated with the source communication system; and receiving the message at the at least one destination communication system and updating a memory associated with each of the destination communication systems with the new identifier for the source communication system.

13. The method of claim 12, further comprising:

transmitting an acknowledge signal from the at least one destination communication system back to the source communication system if the at least one destination communication system was able to receive the message indicating a new identifier for the source communication system and update a memory that stores the identifier of the source communication system.

14. The method of claim 13, further comprising:

generating a human readable message that indicates a new identifier for the source communication system.

15. The method of claim 14, wherein the human readable message is transmitted to those destination communication systems that did not transmit an acknowledge signal.

16. The method of claim 12, wherein the at least one destination communication system includes at least one telephone or facsimile machine, and the new identifier includes a telephone number.

17. The method of claim 12, wherein the at least one destination communication system includes at least one computer system, and the new identifier includes an e-mail address.

18. A telecommunication system including a source telecommunication device that is identified by an identifier and at least one destination telecommunication device, each such destination device being identified by a unique identifier, comprising:

a memory associated with the source telecommunication device that stores an identifier of the at least one destination telecommunication device that has previously communicated with the source telecommunication device; and a processor coupled to the source telecommunication device that is programmed to recall the identifier of the at least one destination telecommunication device that has previously communicated with the source telecommunication device, the processing being further programmed to generate a message indicating a new identifier for the source telecommunication device and to transmit the message to each destination telecommunication device, wherein the new identifier for the source telecommunication device is a telephone number and the at least one destination telecommunication device includes a telephone or facsimile machine; and a processor coupled to each destination telecommunication device that receives the message and updates a memory that stores said new identifier for the source telecommunication device.

19. The telecommunication system of claim 18, wherein the source telecommunication device and the at least one destination telecommunication device are telephones, and the source telecommunication device is identified by a unique identifier.

20. The telecommunication system of claim 18, wherein the source telecommunication device and the at least one destination telecommunication device are facsimile machines, and the source telecommunication device is identified by a unique identifier.

21. The telecommunication system of claim 18, wherein the memory associated with the source telecommunication device includes a speed dial memory.

22. The telecommunication system of claim 18, wherein the memory associated with the source telecommunication device includes a database of telecommunication devices that have previously initiated communication with the source telecommunication device.

23. A communication device, hereinafter referred to as the source communication device, wherein the source communication device is capable of communication with one or more other communication devices that have memories and processors, the source communication device comprising:

a memory that stores an identifier of each of at least one communication device that has previously communicated with the source communication device; the at least one communication device that has previously communicated with the source communication device hereinafter referred to as the at least one destination communication device; and a processor coupled to the source communication device, wherein the processor is programmed to recall the identifier of the at least one destination communication device, and the processor is further programmed to determine a message indicating a new identifier for the source communication device and to transmit the message to the at least one destination communication device;

wherein the at least one destination communication device includes at least one telephone or facsimile machine, and a processor of a destination communication device that receives the message updates a memory of that destination communication device previously storing an old identifier for the source communication device to store the new identifier.

24. The source communication device of claim 23, wherein the new identifier for the source communication device is a new telephone number for the source communication device that has replaced an old telephone number for the source communication device.

25. The source communication device of claim 23, wherein the message also indicates an old identifier for the source communication device.

26. The source communication device of claim 23, wherein the memory that stores an identifier of each of at least one communication device that has previously communicated with the source communication device includes a speed dial memory.

27. The source communication device of claim 23, wherein the memory that stores an identifier of each of at least one communication device that has previously communicated with the sorce communication device includes a database of communication devices that have previously initiated communication with the source communication device.

28. The source communication device of claim 23, wherein processor is further programmed to receive an acknowledgement signal from the at least one telehpone or facsimile machine, and, for a telephone or facsimile machine from which the acknowledgment signal is not received, to generate and send to that telephone or facsimile machine a human understandable message that indicates the new identifier for the source communication system.

29. The source communication device of claim 28, wherein processor is further programmed to, for a telephone or facsimile machine from which the acknowledgment signal is received, to generate and send to that telephone or facsimile machine a human understandable message indicating that that telephone or facsimile machine has been updated with new information.

30. A communication system device, hereinafter referred to as the destination communication device, wherein the destination communication device is capable of communication with another communication device, hereinafter referred to as the source communication device, the destination communication device comprising:

a memory that stores identifiers for communication devices, including an identifier for the source communication device, the identifier for the source communication device being for use in contacting the source communication device; and a processor coupled to the memory, wherein the processor is programmed to receive a message that indicates a new identifier for the source communication device, and to update the memory based on the message to store the new identifier for the source communication device without requiring human data entry of the new identifier for the source communication device, wherein the message was generated not due to any attempt by the destination communication device to contact the source communication device using an old identifier for the source communication device;

wherein the new identifier for the source communication device is a telephone number for the source communication device, and the destination communication device is a telephone or facsimile machine.

31. The destination communication device of claim 30, wherein the memory is a speed dial memory.

32. The destination communication device of claim 30, wherein the memory is a database that stores identifiers for communication devices that have been contacted by the destination communication device.

33. The destination communication device of claim 30, wherein the memory is a database that stored identifiers for communication devices that have initiated contact with the destination communication device.

34. The destination communication device of claim 30, wherein the new identifier for the source communication device is received from the source communication device.

* * * * *